May 26, 1925.

J. A. ARMSTRONG

ADVERTISING NOVELTY

Filed Jan. 26, 1924

Inventor

J. A. Armstrong

By Lacy Lacy, Attorneys

May 26, 1925.

J. A. ARMSTRONG

ADVERTISING NOVELTY

Filed Jan. 26, 1924

Inventor

J. A. Armstrong

By Lacey & Lacey, Attorneys

Patented May 26, 1925.

1,539,231

UNITED STATES PATENT OFFICE.

JESSE A. ARMSTRONG, OF LEXINGTON, KENTUCKY, ASSIGNOR TO SPOTSWOOD SPECIALTY COMPANY, OF LEXINGTON, KENTUCKY.

ADVERTISING NOVELTY.

Application filed January 26, 1924. Serial No. 688,745.

*To all whom it may concern:*

Be it known that I, JESSE A. ARMSTRONG, a citizen of the United States, residing at Lexington, in the county of Fayette and State of Kentucky, have invented certain new and useful Improvements in Advertising Novelties, of which the following is a specification.

This invention relates to a novel advertising medium. It is a well recognized fact that to be of value, an advertising medium must be capable of attracting and holding the attention as otherwise it is likely to be cast aside and not given consideration. This is particularly true of mere printed matter, and, on the other hand, where printed matter is associated with some other feature which will attract and hold the attention, it is more than likely that the printed matter will be given due consideration. It is with this in view that printed descriptive or advertising matter is accompanied by illustrations, but even this does not always constitute a satisfactory advertising medium for the illustrations may or may not be of a character to attract and hold the attention. Obviously, an advertising medium embodying features which give the appearance of animation, are more certain to attract the attention of the observer and it is therefore the primary object of the present invention to provide an advertising medium which will embody means for imparting the idea of motion and in a manner to accord with the printed advertising matter embodied in the medium so that the two will be related and the observer will be influenced to read the printed matter as well as consider the feature which presents a semblance of animation.

Another object of the invention is to provide an advertising medium which may be manufactured at a low cost and which will attract and hold the attention and particularly impress upon the mind of the observer, the trade name of the goods, or any quality which it is desired to emphasize, or, in fact, any information concerning the nature or quality of the goods.

Figure 1:
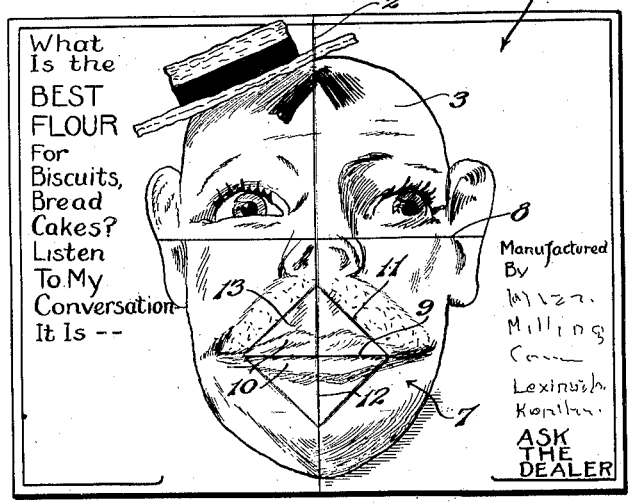
Figure 1 is a front elevation of the advertising medium embodying the invention.
Figure 2:
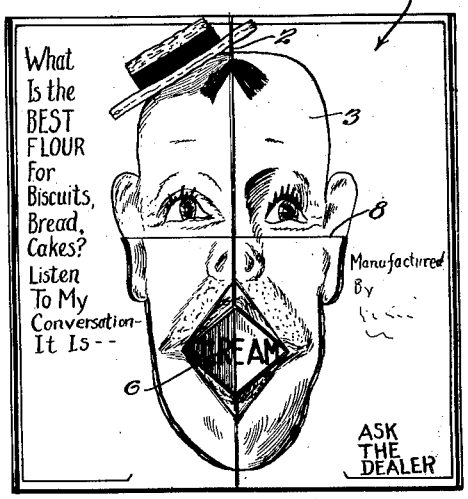
Figure 2 is a similar view illustrating the medium partly folded so as to effect a change in position of the movable parts thereof.
Figure 3:
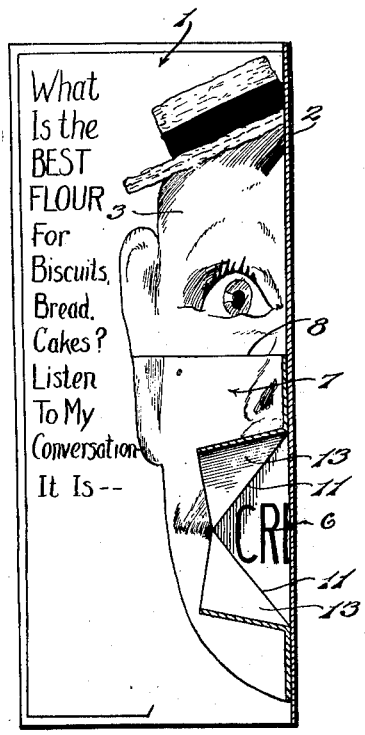
Figure 3 is a detail vertical sectional view taken on the line 3—3 of Figure 5 looking in the direction indicated by the arrows.
Figure 4:
Figure 4 is an upper-edge view of the advertising medium in its flattened out form.
Figure 6:
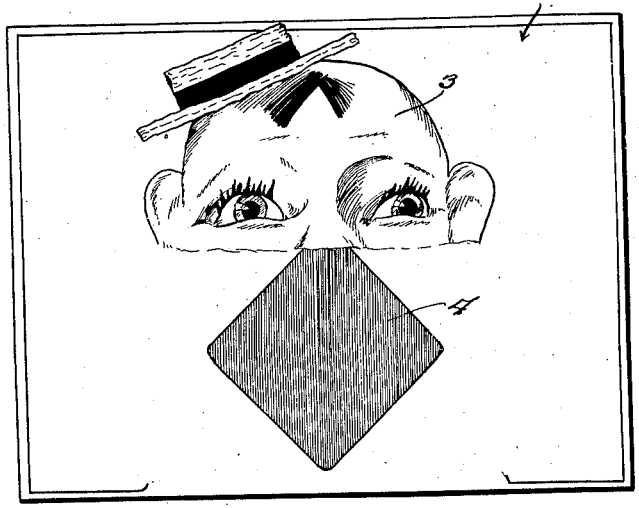
Figure 6 is a view similar to Figure 1 illustrating the body member of the medium before it has been printed.

The device embodying the invention comprises a sheet which is indicated in general by the numeral 1 and which is scored, as at 2, along a vertical line substantially midway between the opposite vertical edges of the sheet, so that the sheet may be readily folded along this line. Upon its face, in the embodiment of the invention illustrated in the drawings, the sheet will bear the representation 3 of the upper portion of a human head, and below this representation will have printed thereon a rectangular or other shaped area, indicated by the numeral 4. The sheet 1 will initially have the appearance shown in Figure 6 of the drawings and as the same representation may be employed in advertising various classes of goods, in filling an order for a number of the devices, the printer will print upon the face of the sheet at one side, as, for example, the left hand side, a question such, for example, as that illustrated in Fig. 1 and indicated by the numeral 5. He will likewise print upon the sheet within the bounds of the area 4, the answer to the question which is indicated in Figures 2 and 3 of the drawings by the numeral 6. This is, of course, merely representative of one embodiment of the invention and instead of a question, an assertion might be made and printed upon the sheet and the conclusion be printed upon the area 4. Various other printed advertising matter may be arranged upon the face of the sheet 1 and in fact this is an arbitrary matter and one to be left to the discretion of the advertiser or the printer.

Figure 7:
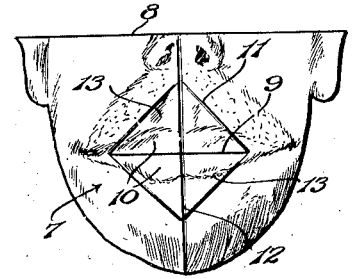
Figure 7 is a similar view illustrating the other member of the medium which is to be applied to the body member after the body member has been printed.

The representation of a human head is completed by a blank which is likewise of sheet material and is indicated in general by the numeral 7. This blank is clearly shown in the several figures of the drawings and particularly in Figure 7 where it is located beside the main blank or sheet 1. This blank may be of the same material as the sheet 1 and of an outline to correspond to the contour of the lower portion of the head. It has a straight upper edge 8 which is designed to register with the representation 3 when the blank is assembled with the sheet as clearly shown in Figures 1, 2 and 3 of the drawings, so that when the blank 7 is adhesively secured to the face of the sheet 1 in proper position, the representation of the human head will be complete. Of course, it will be understood that the entire representation may be printed or lithographed on one integral blank which would be cut along the outline of the representation and then adhesively secured in proper position with relation to the space 7, this arrangement obviating the visible edge of the blank 7 which edge is indicated in the drawings by the numeral 8. However, this is a matter of choice and does not constitute a departure from the spirit of the invention.

Figure 5:
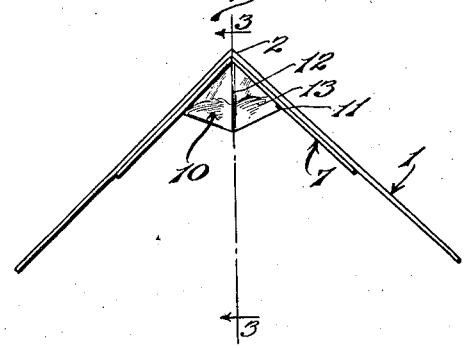
Figure 5 is a similar view illustrating the medium partly folded.

The invention contemplates that the matter printed within the bounds of the area 4 shall be normally concealed from view, whether it be an answer to a question or any other matter. In the illustrated embodiment of the invention it is contemplated that the matter within the area 4 shall be an answer to the question which is indicated by the numeral 5 in the drawings, and, arbitrarily, the question relates to the desirable qualities of a flour and the name of the flour is arbitrarily selected as "Cream." Therefore, the arrangement is such that when the sheet 1 is in flat or substantially flat condition, the lips of the representation 7 will be closed and, when the sheet 1 is partly folded as shown in Figures 2 and 5 of the drawings, the lips of the representation 7 will, by an arrangement which will now be described, open so as to expose the word "Cream" indicated by the numeral 6. In accomplishing this result, the blank 7 is provided with a transverse slit 9 extending substantially medially of the representation of the lips 10 of the lower portion of the face or head of which the representation 7 constitutes a part, and diagonal scores 11 are formed in the blank comprising the representation 7 as well as a vertical score line 12 which intersects the slit 9 midway between its ends. The blank 7 is adhesively secured to the face of the sheet 1 with the score line 12 in alinement with the score line 2 and with the upper edge 8 of the said blank 7 in registration with the lower edge of the representation 3, the portion of the blank 7 defined by the four right angularly positioned score lines 11, however, being left unattached to the sheet 1. It will now be evident that the lip representations 10 extend along the adjacent sides of substantially triangular flaps which are defined by relatively adjacent ones of the score lines 11 and that the incision 9 divides these two flaps. It will also be evident that the score line 12 extends perpendicularly of each flap at the middle thereof. Consequently, when the sheet 1 is folded, together with the blank 7, on the fold lines 2 and 12, the two flaps, which are indicated by the numeral 13, will buckle, so to speak, on the fold line 12 and also on the diagonal fold lines 11 so that their adjacent edges which define the slit 9 will separate, and the appearance will be that of the figure opening its mouth so as to expose the word or the like 6 in the manner disclosed in Figure 2 of the drawings. Upon flattening the sheet 1, the lip portions or flaps 13 will reassume a position within the plane of the blank 7 of which they form a part, and the word 6 will be concealed from view. It will be evident that the invention may, as previously stated, find embodiment in various other forms and that the invention is not restricted to the representation of the human head but other representations may be resorted to, and the invention contemplates scoring, folding, and cutting of blanks constituting representations of various things when applied in the manner of the present invention.

Having thus described the invention, what is claimed as new is:

1. An advertising novelty comprising a sheet having a fold, and a blank secured upon the face of the sheet and having a fold coinciding with the fold of the sheet, the blank having a slit intersecting the fold and having folds extending from the first mentioned fold to the slit.

2. An advertising novelty comprising a sheet having a fold, and a blank secured upon the face of the sheet and having a fold coinciding with the fold of the sheet, the blank having a slit intersecting the fold and having diagonal folds extending from the first mentioned fold to the slit.

3. An advertising novelty comprising a sheet having a fold, and a blank secured upon the face of the sheet and having a fold coinciding with the fold of the sheet, the blank having an edge intersecting the fold and having folds extending from the first mentioned fold to the said edge.

4. An advertising novelty comprising a sheet having a fold, and a blank secured upon the face of the sheet and having a fold coinciding with the fold of the sheet, the blank having a transverse slit intersecting the fold and having diagonal folds extending from the ends of the slit upwardly and downwardly to the first mentioned fold of the said blank.

5. An advertising novelty comprising a sheet having a fold, and a blank secured upon the face of the sheet and having a fold coinciding with the fold of the sheet, the blank having diagonal folds extending from the first mentioned fold to an edge portion of the blank, the blank within the space defined by the said edge portion and the said diagonal folds being unattached to the said sheet.

6. An advertising novelty comprising a sheet having a representation thereon of the upper portion of a human head, the sheet having a fold extending vertically of the said representation medially thereof, and a blank secured upon the face of the sheet and constituting a representation of the lower portion of the head, including the mouth, said blank having a fold coinciding with the fold of the sheet and being provided with a slit intersecting the fold and defining the division between the lips of the mouth, the said blank having diagonal folds extending from the ends of the said slit upwardly and downwardly to the said fold, the portions of the blank defined by the slit and the diagonal folds, being unattached to the sheet.

7. An advertising novelty comprising a sheet having a fold extending between opposite margins thereof, and a blank secured upon the face of the sheet and having a fold registering with the first-mentioned fold, the blank constituting a representation of a subject having a movable part, the portion of the blank which bears the representation of the movable part being provided with a slit and being unattached to the first-mentioned sheet, said portion likewise having a score line constituting a continuation of the fold in the said blank, and the said part having other scores diagonal to the first-mentioned score and leading from the end thereof to the end of the slit.

8. An advertising novelty comprising a sheet bearing a representation of an image having a movable part, the sheet having relatively diverging fold lines formed therein and a fold line intersecting the meeting ends of the first mentioned fold line, the representation of the movable part of the image being represented in the space defined by the angle between the first mentioned fold lines.

9. An advertising novelty comprising a sheet bearing a representation of an image having a movable part, the sheet being divided by a fold line to provide two portions adapted to be opened and closed on said fold line, the said two portions of the sheet having fold lines meeting at one end at the first mentioned fold line and diverging in opposite directions therefrom, the movable part of the image being represented in the space between the second mentioned fold lines.

10. An advertising novelty comprising a sheet having a fold, and a blank secured upon the face of the sheet and scored to provide a fold adapting the portions of the blank at opposite sides of said score to recede from the face of the sheet when the sheet is folded upon its fold, and a representation of an image upon the sheet and blank and having a movable part, the said movable part of the image being represented in the space at opposite sides of the said score.

In testimony whereof I affix my signature.

JESSE A. ARMSTRONG. [L. S.]